United States Patent [19]

Takeo et al.

[11] Patent Number: 4,962,539
[45] Date of Patent: Oct. 9, 1990

[54] METHOD OF RECOGNIZING LAYOUT AND SUBDIVISION PATTERNS OF RADIATION IMAGES

[75] Inventors: Hideya Takeo; Kazuo Shimura, both of Kanagawa, Japan

[73] Assignee: Fuji Photo Film Co., Ltd., Kanagawa, Japan

[21] Appl. No.: 311,901

[22] Filed: Feb. 17, 1989

[30] Foreign Application Priority Data

Feb. 18, 1988 [JP] Japan .................................. 63-35835
Mar. 19, 1988 [JP] Japan .................................. 63-66753

[51] Int. Cl.$^5$ .............................................. G06K 9/20
[52] U.S. Cl. ........................................ 382/9; 382/6; 382/22
[58] Field of Search .......................... 382/32, 9, 6, 22; 378/35

[56] References Cited

U.S. PATENT DOCUMENTS 4,238,780 12/1980 Doemens ............................. 382/22
4,903,310 2/1990 Takeo et al. ......................... 382/30
4,903,311 2/1990 Nakamura ........................... 382/9

Primary Examiner—Leo H. Boudreau
Assistant Examiner—David Fox
Attorney, Agent, or Firm—Sughrue, Mion, Zinn, Macpeak & Seas

[57] ABSTRACT

A method for recognizing the layout pattern of radiation images comprises the steps of preparing two-valued masks, each composed of a two-valued signal representing a layout pattern for radiation images which are to be stored on a stimulable phosphor sheet, and obtaining a preliminary read-out image signal by carrying out preliminary read out on a stimulable phosphor sheet on which radiation images have been stored. The layout pattern of the radiation images is recognized by converting the preliminary read-out image signal into a two-valued image signal, calculating rating values, which represent the degree of pattern matching between the two-valued image signal and the two-valued masks, finding the highest rating value that represents the highest degree of pattern matching among the rating values, and comparing the highest rating value with a predetermined value representing a predetermined degree of pattern matching.

13 Claims, 6 Drawing Sheets

F I G.1A 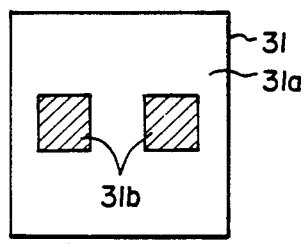
F I G.1B 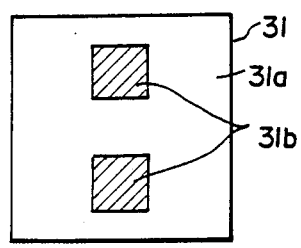
F I G.1C 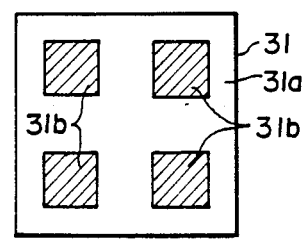
F I G.1D 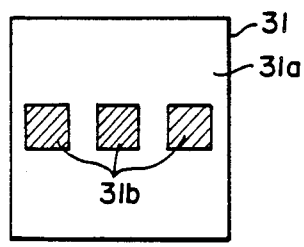
F I G.1E 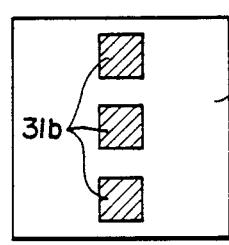
F I G.1F 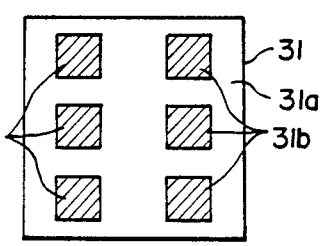
F I G.2 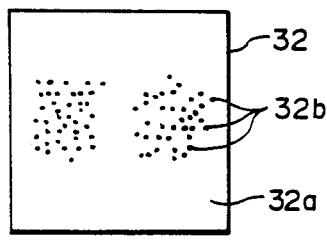

METHOD OF RECOGNIZING LAYOUT AND SUBDIVISION PATTERNS OF RADIATION IMAGES

BACKGROUND OF THE INVENTION

1. Field of the Invention

This invention relates to a radiation image read-out and reproducing system for scanning a recording medium such as a stimulable phosphor sheet, on which a single radiation image or a plurality of radiation images are recorded, with a light beam, obtaining image signals which carry information about the radiation images from the scanning process, and reproducing visible images by use of the image signals. This invention particularly relates to a method for recognizing the layout pattern of radiation images recorded on the recording medium. This invention also relates to a method for automatically recognizing a subdivision pattern of radiation images recorded on the recording medium such as a stimulable phosphor sheet.

2. Description of the Prior Art

Techniques for reading out a recorded radiation image and obtaining an image signal therefrom, carrying out appropriate image processing of the image signal, and then reproducing a visible image by use of the processed image signal have heretofore been known in various fields. For example, as disclosed in Japanese Unexamined Patent Publication No. 54(1979)-121043, an X-ray image is recorded on an X-ray film having a gamma value designed so as to match image processing, the X-ray image is read out from the X-ray film and converted into an electric signal, the electric signal (image signal) is image-processed and then used for reproducing the X-ray image as a visible image on a copy photograph or the like. In this manner, a visible image having good image quality such as high contrast, high sharpness and high graininess can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored when it was exposed to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays such as a laser beam which cause it to emit light in proportion to the amount of energy stored during exposure to radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

The radiation image recording and reproducing system using a stimulable phosphor sheet is advantageous over conventional radiography using a silver halide photographic material in that an image can be recorded for a very wide range (latitude) of radiation energy intensities. More specifically, since the amount of light emitted upon stimulation after the radiation energy is stored on the stimulable phosphor varies over a wide range and is proportional to the amount of said stored energy, it is possible to obtain an image having a desirable density regardless of the energy intensity range of the radiation to which the stimulable phosphor sheet was exposed, by reading out the emitted light with an appropriate read-out gain and converting it into an electric signal to reproduce a visible image on a recording medium or a display device.

In order to detect the image signal correctly, the energy intensity range of the exposing radiation and other conditions must be determined from the recorded radiation image. Therefore, the aforesaid radiation image recording and reproducing system may be constituted such that a preliminary read out for approximately ascertaining the radiation image stored on the stimulable phosphor sheet is carried out by scanning the stimulable phosphor sheet with a light beam of a comparatively low energy level, and a preliminary read-out image signal, obtained from the preliminary read-out process, is analyzed. Thereafter, the final read out for obtaining the image signal used in reproducing a visible image is carried out by scanning the stimulable phosphor sheet with a light beam of a comparatively high energy level and reading out the radiation image under conditions adjusted on the basis of the results of an analysis of the preliminary read-out image signal.

Regardless of whether the preliminary read out is or is not carried out, it has also been proposed to analyze the preliminary read-out image signal or the image signal obtained and thereafter to adjust the conditions under which processing of the image signal is carried out on the basis of the results of the analysis of the image signal. The proposed method is applicable to cases where an image signal is obtained from a radiation image recorded on a recording medium such as conventional X-ray film, as well as to systems using stimulable phosphor sheets.

In the aforesaid radiation image recording and reproducing system, a plurality of radiation images are often recorded on a single recording medium such as a stimulable phosphor sheet for the purpose of efficiently utilizing the recording medium or for comparing radiation images of a single object recorded at different angles.

If it is not known that a plurality of radiation images exist on a single recording medium or the layout of the images on the medium is not known before the radiation images are read out from a single recording medium or are image-processed, the conditions under which a final read out is conducted and/or the conditions under which an image signal is processed are adjusted such that all of the radiation images recorded on a single recording medium are regarded as a single radiation image. In these cases, few problems arise when the image recording conditions and the consequent required image processing do not differ very much among the radiation images recorded on a single recording medium. However, when the image recording conditions and the consequent required image processing differ greatly among the radiation images recorded on a single recording medium, adjusting the conditions under which a final read out is conducted and/or the conditions under which an image signal is processed, as if all of the radiation images recorded on a single recording medium were a single radiation image, is unsuitable. As a result, visible images are reproduced with unsuitable densities, or images unsuitable for viewing purposes are reproduced because of inappropriate processing of the image signals.

These problems may be eliminated by inputting the number and layout of the radiation images recorded on the recording medium from a keyboard or the like into an apparatus before the radiation images are read out from the recording medium. However, the inputting operation is troublesome. Also, when an operator fails to input or erroneously inputs the number and layout of the radiation images recorded on the recording medium, the same problems described above arise, and the operator is often required to carry out the recording of an image again.

Also, in the aforesaid radiation image recording and reproducing system, in order to eliminate various influences caused by variations in the image recording conditions and/or to obtain a radiation image having a good image quality with enough accuracy to aid in efficient diagnoses of illnesses, it is desirable to ascertain the conditions under which the radiation image was stored on the stimulable phosphor sheet such as, for example, the radiation energy intensity levels used for image recording, or the image input pattern which is determined by the portion of the object (e.g. the chest or the abdomen of a human body) or the image recording method used, such as plain image recording or contrasted image recording, before reproducing the radiation image as a visible image, and then to adjust the read-out gain to an appropriate value based on the ascertained image recording conditions or the image input pattern. The image recording conditions and the image input pattern will hereinafter be referred to simply as the image input information when they are referred to generically. It is also desirable to adjust the scale factor to optimize the resolution in accordance with the contrast in the image input pattern.

The ascertaining of the image input information may be carried out prior to the reproduction of the visible image by use of the method disclosed in Japanese Unexamined Patent Publication No. 58(1983)-67240. In this method, a preliminary read out for ascertaining the image input information of a radiation image stored on a stimulable phosphor sheet is carried out in advance by use of stimulating rays having a stimulation energy of a level lower than the level of the stimulation energy of the stimulating rays used in the final read out from which a visible image for viewing is obtained, which visible image is used particularly for diagnostic purposes. After the preliminary read out the final read-out is carried out. In the final read out, the read-out gain and/or the scale factor is adjusted to an appropriate value, and/or some type of appropriate signal processing is conducted, on the basis of the image input information obtained in the preliminary read out.

Various methods may be used for approximately ascertaining the image input information from the preliminary read-out image signal obtained by performing the aforesaid preliminary read out. One method is to utilize a histogram of the preliminary read-out image signal. Specifically, the image input information can be ascertained from, for example, a characteristic value such as the maximum signal value, the minimum signal value, or a signal value at a point where the frequency in the histogram is at a maximum. Therefore, a visible radiation image having improved image quality, particularly a quality allowing for a high diagnostic efficiency and accuracy, can be reproduced by adjusting, on the basis of the histogram, the conditions under which the final read out is carried out such as the read-out gain and the scale factor and/or the conditions under which the image signal is processed.

On the other hand, in the course of radiation image recording, it is often desirable to prevent portions of an object not related to a diagnosis or the like from being exposed to radiation. Further, when portions of the object not related to a diagnosis or the like are exposed to radiation, the radiation is scattered by such portions to the portion related to the diagnosis or the like, and the contrast and resolution of the reproduced image are adversely affected by the scattered radiation. Therefore, in many cases, when a radiation image is recorded, the irradiation field is limited to an area smaller than the overall recording region on the stimulable phosphor sheet.

However, in cases where the image input information is ascertained in the manner described above, the problem described below arises. When an irradiation field is limited to an area smaller than the image recording region on the stimulable phosphor sheet and the preliminary read out is carried out over an area markedly larger than the irradiation field, for example, over the overall image recording region on the stimulable phosphor sheet, the image input information is ascertained incorrectly. Specifically, in the aforesaid case, since the preliminary read out image signals at regions outside of the irradiation field are also included in the histogram, the histogram does not accurately represent the actual image input information stored within the irradiation field.

The applicant has proposed various methods for recognizing an irradiation field such as the method disclosed in, for example, Japanese Unexamined Patent Publication No. 61(1986)-39039. The aforesaid problem can be eliminated by automatically recognizing the irradiation field by use of the proposed methods, and carrying out the preliminary read out only over the region thus recognized.

On the other hand, in the course of radiation image recording on a recording medium such as stimulable phosphor sheets, subdivision image recording is often carried out. In subdivision image recording, the recording area on the stimulable phosphor sheet is divided into a plurality of predetermined subdivisions, and the respective subdivisions are exposed to radiation in order to record images thereon. Subdivision image recording is economical since, for example, when an image of a small portion of an object is recorded on a large stimulable phosphor sheet, images of a plurality of object portions may be recorded on a single stimulable phosphor sheet. Also, the radiation image recording and read-out processing speed becomes high.

However, when irradiation fields are limited during subdivision image recording, the respective irradiation fields become separated from each other. FIG. 5 shows the condition of a single stimulable phosphor sheet 103 in a case where subdivision image recording was carried out by dividing the recording region on the stimulable phosphor sheet 103 into two subdivisions, and the irradiation field was limited in each subdivision image recording step. In FIG. 5, B1 and B2 denote the respective irradiation fields. In most conventional methods for recognizing an irradiation field, the recognition process is carried out on the assumption that a single irradiation field is present on a single stimulable phosphor sheet. With such methods, irradiation fields such as those shown in FIG. 5 are recognized incorrectly. On the other hand, a method for automatically recognizing a plurality of irradiation fields on a single stimulable phosphor sheet has also been proposed. However, with the proposed method, the algorithm for recognition of the irradiation fields becomes very complicated, and a very expensive apparatus is necessary for executing the method.

In cases where information on the positions of the respective subdivisions is entered manually into an irradiation field recognizing apparatus, processing for detecting a single irradiation field in each subdivision may be carried out, and the problem of the algorithm's for recognition of the irradiation fields becoming very complicated can be eliminated. However, it is very troublesome to manually enter the subdivision pattern each time radiation image read out from the stimulable phosphor sheet is to be carried out.

The problems described above arise also when radiation images are read out from recording media different from stimulable phosphor sheets.

SUMMARY OF THE INVENTION

The primary object of the present invention is to provide a method for recognizing the layout pattern (including the number) of radiation images, which are recorded on a recording medium, on the basis of image signals (including preliminary read-out image signals) detected from the recording medium.

Another object of the present invention is to provide a method for automatically recognizing the subdivision pattern of radiation images stored on a recording medium such as a stimulable phosphor sheet.

The specific object of the present invention is to provide a method for recognizing the subdivision pattern of radiation images, which enables reproduction of visible radiation images suitable for viewing and being used in making diagnoses.

The present invention provides, in a radiation image read-out and reproducing system for scanning a stimulable phosphor sheet, on which a single radiation image or a plurality of radiation images have been stored, with a light beam which causes the stimulable phosphor sheet to emit light in proportion to the amount of energy stored during exposure to radiaiton, photoelectrically detecting the emitted light to obtain image signals, and reproducing visible images by use of the image signals, a method for recognizing the layout pattern of radiation images, which comprises the steps of:

(i) preparing in advance a two-valued mask composed of a two-valued signal corresponding to a single type of layout pattern of radiation images which are to be stored on a stimulable phosphor sheet, or preparing in advance two-valued masks each composed of a two-valued signal which corresponds to one of a plurality of types of layout patterns of radiation images which are to be stored on a stimulable phosphor sheet, (ii) obtaining a preliminary read-out image signal by carrying out preliminary read out, wherein radiation images stored on a stimulable phosphor sheet are approximately ascertained by scanning said stimulable phosphor sheet with a light beam, having an energy level lower than the energy level of the light beam used for the final read out, before the final read out for obtaining said image signal for use in the reproduction of visible images is carried out by detecting the light emitted by said stimulable phosphor sheet in proportion to the amount of energy stored during exposure to radiation, and (iii) recognizing the layout pattern of said radiation images by:

(a) converting said preliminary read-out image signal into a two-valued system to obtain a two-valued image signal, (b) calculating rating values, which represent the degree of pattern matching between said two-valued image signal and each of said two-valued masks, (c) finding the highest rating value that represents the highest degree of pattern matching among the rating values thus calculated, and (d) comparing said highest rating value with a predetermined value representing a predetermined degree of pattern matching.

The method for recognizing the layout pattern of radiation images in accordance with the present invention is applicable also to a general types of systems for reading out radiation images from a recording medium on which a radiation image has been recorded, such as a system for reading out a radiation image recorded on a conventional X-ray film, as well as to systems utilizing stimulable phosphor sheets. Further, the method for recognizing the layout pattern of radiation images in accordance with the present invention is applicable to systems wherein no preliminary read out is carried out.

Accordingly, the present invention also provides, in a radiation image read-out and reproducing system for scanning a recording medium, on which a single radiation image or a plurality of radiation images have been recorded, with a light beam, photoelectrically detecting light which is emitted from the recording medium during the scanning and which carries information representing the radiation images, thereby to obtain image signals, and reproducing visible images by use of the image signals, a method for recognizing the layout pattern of radiation images, which comprises the steps of:

(i) preparing in advance a two-valued mask composed of a two-valued signal corresponding to a single type of layout pattern of radiation images which are to be recorded on a recording medium, or preparing in advance two-valued masks each composed of a two-valued signal which corresponds to one of a plurality of types of layout patterns of radiation images which are to be recorded on a recording medium, and (ii) recognizing a layout pattern of said radiation images by:

(a) converting said image signals into a two-valued system to obtain a two-valued image signal, (b) calculating rating values, which represent the degree of pattern matching between said two-valued image signal and each of said two-valued masks, (c) finding the highest rating value that represents the highest degree of pattern matching among the rating values thus calculated, and (d) comparing said highest rating value with a predetermined value representing a predetermined degree of pattern matching.

In the method for recognizing the layout pattern of radiation images in accordance with the present invention, the two-valued masks composed of two-valued signals representing layout patterns of radiation images recorded on a recording medium, such as a stimulable phosphor sheet, are prepared in advance so that each two-valued mask corresponds to a layout pattern. The image signals (including the preliminary read-out image signal) obtained by reading out the radiation images recorded on the recording medium are converted into a two-valued system to obtain two-valued image signals. The two-valued mask which has the highest degree of pattern matching with a two-valued image signal is found. When the degree of pattern matching of the two-valued mask thus found is higher than a predetermined value, it is recognized that the radiation images recorded on the recording medium have a layout pattern corresponding to the pattern represented by the two-valued mask. Therefore, with the method for recognizing the layout pattern of radiation images in accordance with the present invention, the layout pattern can be recognized automatically and utilized in adjusting the conditions under which the final read out is carried out and/or the image processing conditions even though no layout pattern is specified in advance from a keyboard or the like.

The present invention further provides a method for recognizing the subdivision pattern of radiation images, which comprises the steps of, in the course of reading out radiation image information from a recording medium on which the radiation image information of an object has been recorded by radiation image recording, and obtaining image signals representing the radiation image information:

(i) in cases where subdivision image recording has been carried out by exposing each of a plurality of predetermined subdivisions on said recording medium to radiation, calculating a characteristic value which represents the degree of variation of the values of an image signal at a recording medium region which may constitute a boundary between said subdivisions (i.e. a characteristic value such as the variance or the difference between the maximum value and the minimum value), and (ii) recognizing an image subdivision pattern on said recording medium by determining, when said characteristic value is comparatively small, that a subdivision was effected at said recording medium region, and by determining, when said characteristic value is comparatively large, that no subdivision was effected at said recording medium region.

In cases where it is found from the processing done in the manner described above that the characteristic values are comparatively large at all regions on the recording medium, it may be recognized that subdivision recording was not carried out in the course of image recording. Such cases are equivalent to recognition of a null subdivision pattern. Therefore, the recognition of a subdivision pattern in accordance with the present invention also embraces the case of the recognition of such a recording condition.

The region outside of an irradiation field on a recording medium, such as a stimulable phosphor sheet, is exposed to scattered radiation during image recording. Therefore, image signals for such regions do not fluctuate very much, and the degree of variation in the image signal for such regions becomes markedly lower than that in the part of the image signal corresponding to a region constituting part of an ordinary image. Accordingly, when it is known in advance that image recording is carried out in a two-on-one subdivision pattern as shown in FIG. 5 or in a null subdivision pattern, the characteristic value may be calculated in a region extending vertically along the middle of the recording medium as viewed in the horizontal direction of an image. When the characteristic value thus calculated is comparatively small, it can be determined that the recording area on the recording medium has been divided at said region into two subdivisions. When the characteristic value thus calculated is comparatively large, it can be judged that the recording area on the recording medium has not been divided.

With the method for recognizing a subdivision pattern of radiation images in accordance with the present invention, a subdivision pattern on a recording medium, such as a stimulable phosphor sheet, can be recognized reliably, and the image input information on the object can be detected accurately for the image stored at each subdivision, thereby to adjust the read out conditions under which the final read out is carried out and/or to carry out image processing appropriately. Accordingly, with the method for recognizing the subdivision pattern of radiation images in accordance with the present invention, it is possible to obtain a reproduced visible radiation image suitable for viewing, particularly for diagnostic purposes.

BRIEF DESCRIPTION OF THE DRAWINGS

FIGS. 1A through 1F are schematic views showing examples of two-valued masks,

FIG. 2 is a schematic view showing examples of two-valued image signals,

DESCRIPTION OF THE PREFERRED EMBODIMENTS

Figure 3:
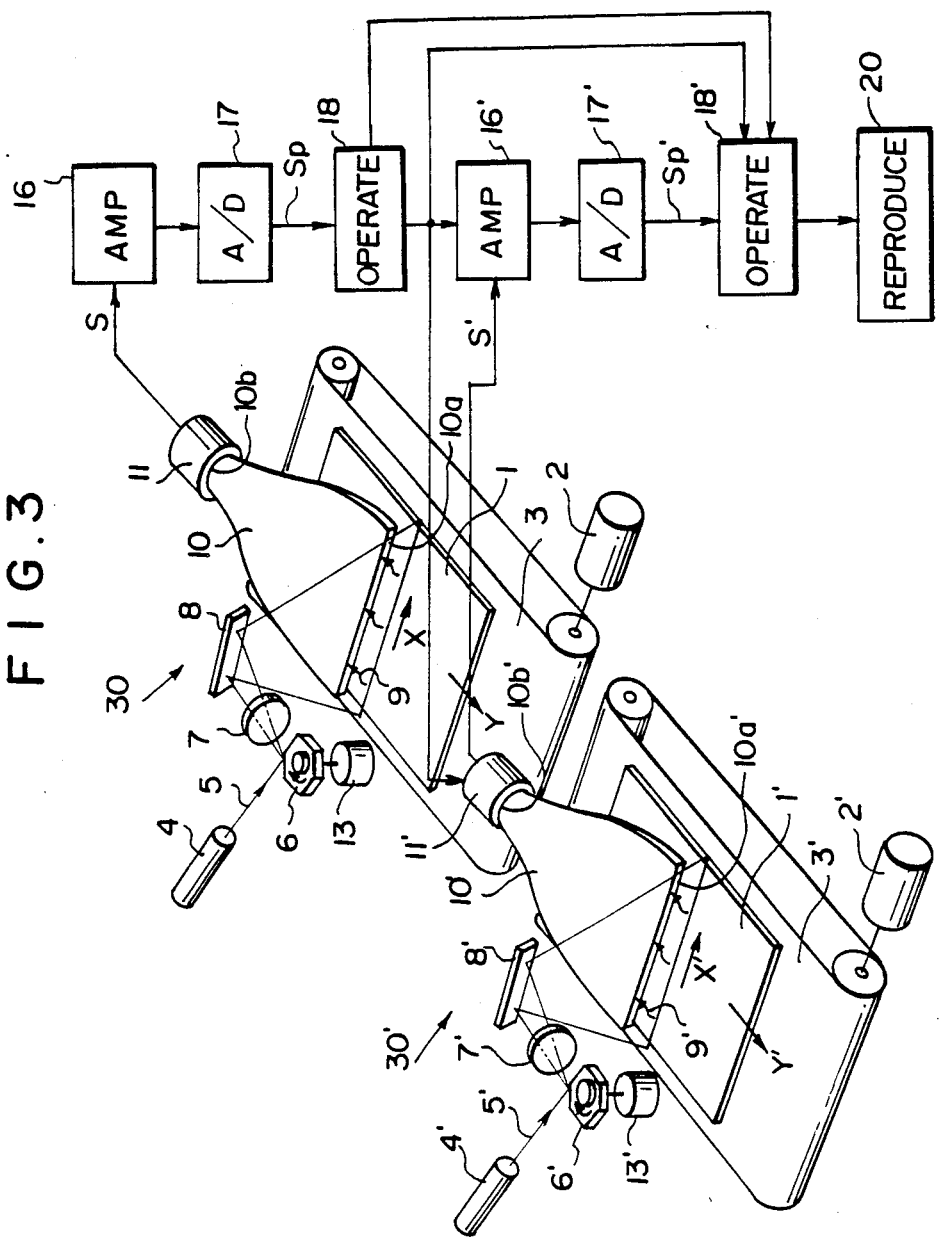
FIG. 3 is a schematic view showing a radiation image read-out and reproducing system wherein an embodiment of the method for recognizing the layout pattern of radiation images in accordance with the present invention is employed.

The present invention will hereinbelow be described in further detail with reference to the accompanying drawings.

A radiation image read-out and reproducing system wherein an embodiment of the method for recognizing the layout pattern of radiation images in accordance with the present invention is employed will first be described with reference to FIG. 3. In this radiation image read-out and reproducing system, a stimulable phosphor sheet is utilized, and preliminary read out is carried out.

A stimulable phosphor sheet 1 on which a single radiation image or a plurality of radiation images have been stored is placed at a predetermined position in a preliminary read-out section 30 for carrying out preliminary read out by scanning the stimulable phosphor sheet 1 with a light beam having a low energy level, and releasing only part of the stored radiation energy from the stimulable phosphor sheet 1. The stimulable phosphor sheet 1 is conveyed in a sub-scanning direction indicated by the arrow Y by a sheet conveyance means 3 constituted of an endless belt or the like operated by a motor 2. A laser beam 5 having a low energy level produced by a laser beam source 4 is reflected and deflected by a rotating polygon mirror 6 quickly rotated by a motor 13 in the direction indicated by the arrow, and passes through a converging lens 7 constituted of an f$\theta$ lens or the like. The direction of the optical path of the laser beam 5 is then changed by a mirror 8, and the laser beam 5 impinges upon the stimulable phosphor sheet 1 and scans it in a main scanning direction indicated by the arrow X, a direction which is approximately normal to the sub-scanning direction indicated by the arrow Y. As the stimulable phosphor sheet 1 is exposed to the laser beam 5, the exposed portion of the stimulable phosphor sheet 1 emits light 9 in an amount proportional to the amount of energy stored during exposure to the radiation. The emitted light 9 is guided by a light guide member 10, and photoelectrically detected by a photomultiplier 11 which acts as a photodetector. The light guide member 10 is made from a light guiding material such as an acrylic plate, and has a linear light input face 10a positioned so that it extends along the main scanning line on the stimulable phosphor sheet 1, and a ring-shaped light output face 10b in close contact with a light receiving face of the photomultiplier 11. The emitted light 9 entering the light guide member 10 from its light input face 10a is guided through repeated total reflection inside of the light guide member 10, emanates from the light output face 10b, and is received by the photomultiplier 11. In this manner, the amount of the emitted light 9, which carries information about the radiation image, is detected by the photomultiplier 11.

An analog output signal S generated by the, photomultiplier 11 is amplified by an amplifier 16, and digitized by an A/D converter 17 into a preliminary read-out image signal Sp.

From the preliminary read out, read-out conditions such as the value of a voltage applied to the photomultiplier 11 and the amplification factor of the amplifier 16 are determined so that image information can be detected even when there is a wide range in the amount of radiation energy stored on the stimulable phosphor sheet 1.

The preliminary read-out image signal Sp obtained in the manner described above is fed into an operating section 18. The operating section 18 recognizes the layout pattern of the radiation images stored on the stimulable phosphor sheet 1 on the basis of the preliminary read-out image signal Sp, and suitably adjusts the conditions under which the final read out is carried out for each radiation image stored on the stimulable phosphor sheet 1. The read-out conditions for the final read out are adjusted by referring to the layout pattern of the radiation images so that the light emitted by regions where object images are truly present is detected accurately and light emitted by a region where no object image is present and which was exposed only to scattered radiation is not misinterpreted.

A stimulable phosphor sheet 1' on which the preliminary read out is finished is placed at a predetermined position in a final read-out section 30', and scanned with a light beam having an energy level higher than that of the light beam used in the preliminary read out, thereby to obtain an image signal. The configuration of the final read-out section 30' is nearly the same as that of the preliminary read-out section 30, and therefore elements corresponding to those constituting the preliminary read-out section 30 are numbered with corresponding primed reference numerals in FIG. 3.

On the basis of the preliminary read-out image signal Sp, the operating section 18 adjusts the conditions under which the final read out will be carried out, such as the value of a voltage applied to a photomultiplier 11', and the amplification factor of an amplifier 16'.

An analog output signal S' generated by the photomultiplier 11' is amplified by an amplifier 16', and digitized by an A/D converter 17' into an image signal Sp' The image signal Sp' is fed into an operating section 18'. The operating section 18' refers to the layout pattern recognized by the operating section 18. The conditions under which the final read out will be carried out are adjusted by the operating section 18, and image processing will be correctly carried out on each radiation image stored on the stimulable phosphor sheet 1. The image signal, which was processed by the operating section 18', is fed into a reproducing apparatus 20 and used to reproduce a visible image.

FIGS. 1A through 1F show examples of two-valued masks composed of two-valued signals representing layout patterns so that the two-valued masks correspond to the layout patterns of radiation images which are to be stored on the stimulable phosphor sheet 1 shown in FIG. 3. The layout patterns of the radiation images stored on the stimulable phosphor sheet 1 include a pattern in which a single radiation image is stored nearly at the middle of the stimulable phosphor sheet 1, as well as the layout patterns corresponding to the two-valued masks shown in FIGS. 1A through 1F.

In FIGS. 1A through 1F, an outer frame 31 corresponds to the overall area of a single stimulable phosphor sheet, a region 31a indicates a region where the value of the image signal is "0", and hatched regions 31b, 31b, . . . indicate regions where the value of the image signal is "1". The two-valued masks shown in FIGS. 1A through 1F are stored in advance in the operating section 18 shown in FIG. 3.

The preliminary read-out image signal Sp obtained by the preliminary read-out section 30 shown in FIG. 3 and sent to the operating section 18 is converted into a two-valued image signal. In order to obtain a two-valued image signal, a threshold value, such as a mean value, a median value, a value obtained by adding a predetermined value to the minimum value, or a value obtained by subtracting a predetermined value from the maximum value, is compared with all the picture elements on the stimulable phosphor sheet 1, i.e. all the values of the image signal Sp. Each instantaneous value of the preliminary read-out image signal Sp is compared with the threshold value, and is converted into a value of "1" when the signal value is larger than the threshold value, or is converted into a value of "0" when the signal value is smaller than the threshold value.

FIG. 2 shows an example of the two-valued image signals obtained in the manner described above.

With reference to FIG. 2, an outer frame 32 corresponds to the overall area of a single stimulable phosphor sheet as in the case of the outer frame 31 shown in FIGS. 1A through 1F. Black dots 32b, 32b, . . . indicate the points at which the value of the two-valued image signal is "1", and a region 32a indicates the region where the value of the two-valued image signal is "0".

The instantaneous values of two-valued image signal are then compared with each of the two-valued masks shown in FIGS. 1A through 1F, and rating values which represent the degree to which the pattern of the image signal matches the two-valued masks are calculated.

By way of example, when the two valued image signal (as shown in FIG. 2) is compared with each two-valued mask, the number of points at which both the value of the two-valued image signal and the value of the two-valued signal of the two-valued mask at corresponding picture elements on the stimulable phosphor sheet are "1" may be counted. The count value thus obtained may be used as the rating value. Alternatively, the number of points at which both the value of the two-valued image signal and the value of the two-valued signal of the two-valued mask at corresponding picture elements are "0" may be counted, and the count value thus obtained may be used as the rating value. Also, the number of points at which both the value of the two-valued image signal and the value of the two-valued signal of the two-valued mask at corresponding picture elements are "1", and the number of points at which both said values are "0" may be added together, and the sum thus obtained may be used as the rating value.

After rating values have been obtained for each of the two-valued masks, the highest rating value, representing the highest degree of pattern matching among the rating values, is found. The highest rating value is then compared with a predetermined value representing a predetermined degree of pattern matching. When the highest rating value is larger than the predetermined value, it is judged that the layout pattern of the radiation images is equivalent to the layout pattern of the two-valued mask corresponding to the highest rating value. On the other hand, when the highest rating value is smaller than the predetermined value and it is judged that the layout pattern of the radiation images is not equivalent to the layout pattern of the two-valued mask corresponding to the highest rating value, it is recognized that a single radiation image is present substantially over the overall area of the stimulable phosphor sheet.

The operating section 18 shown in FIG. 3 recognizes the layout pattern in the manner described above. Therefore, by considering the layout pattern, the conditions under which the final read-out will be carried out can be adjusted appropriately, and image processing can be accurately carried out in the operating section 18'.

The method for recognizing the layout patterns of radiation images in accordance with the present invention is applicable also to a radiation image read-out and reproducing system wherein image read-out corresponding to the final read-out in the embodiment described above is carried out directly without carrying out the preliminary read-out. In this case, the image read-out process is carried out with under conditions, which have been predetermined without considering the layout pattern of the radiation images. The layout pattern of the radiation images is recognized in the manner described above on the basis of image signals obtained during image read-out. The recognized layout pattern is utilized in processing the image signals or the like.

The method for recognizing the layout pattern of radiation images in accordance with the present invention is generally applicable to a radiation image read out and reproducing system for scanning a recording medium, on which a single radiation image or a plurality of radiation images have been recorded, with a light beam, photoelectrically detecting light which is emitted from the recording medium during scanning and which carries information representing the radiation images, thereby to obtain image signals, and reproducing visible images by use of the image signals. For example, the method for recognizing the layout pattern of radiation images in accordance with the present invention is applicable to a radiation image read-out and reproducing system wherein a conventional X-ray film is utilized, as well as a radiation image read-out and reproducing system wherein a stimulable phosphor sheet is utilized.

An embodiment of the method for recognizing the subdivision pattern of radiation images in accordance with the present invention will be described hereinbelow.

Figure 4:
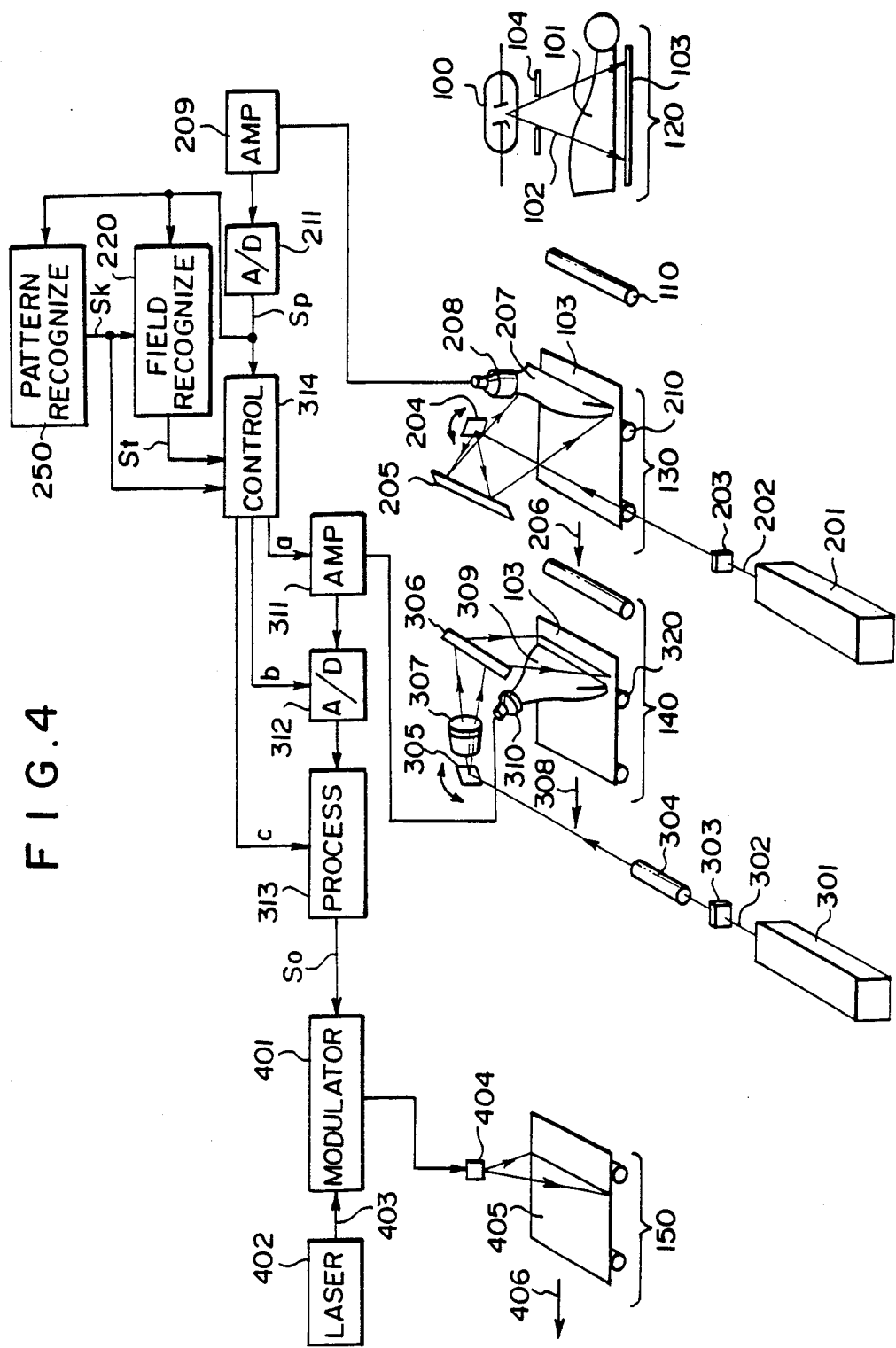
FIG. 4 is a schematic view showing a radiation image recording and reproducing system wherein read out of radiation image information is carried out by recognizing the subdivision pattern with an embodiment of the recognition method in accordance with the present invention.

FIG. 4 shows a radiation image recording and reproducing system wherein an embodiment of the method for recognizing the subdivision pattern of radiation images in accordance with the present invention is employed. Basically, the radiation image recording and reproducing system comprises a radiation image recording section 120, a preliminary read-out section 130, a final read-out section 140, and an image reproducing section 150. At the radiation image recording section 120, radiation 102 is emitted by a radiation source 100, constituted of an X-ray tube or the like, toward an object 101. A stimulable phosphor sheet 103 for storing radiation energy thereon is placed at the position exposed to the radiation 102 which has passed through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the preliminary read-out section 130 by a sheet conveyance means 110 constituted of a conveyor roller or the like. At the preliminary read-out section 130, a laser beam 202 emanating from a laser beam source 201 is first passed through a filter 203 for filtering out light having wavelengths within the range of the wavelengths of light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanated therefrom has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction indicated by arrow 206 (i.e. in the sub-scanning direction) by a sheet conveyance means 210 constituted of conveyor rollers or the like, and thus the overall surface of the stimulable phosphor sheet 103 is exposed to and scanned by the laser beam 202. The power of the laser beam source 201, the beam diameter of the laser beam 202, the scanning speed of the laser beam 202, and the speed with which the stimulable phosphor sheet 103 is moved are selected so that the level of the stimulation energy of the laser beam 202 during the preliminary read out is lower than the level of the stimulation energy of the laser beam during the final read out carried out in the final read-out section 140.

When exposed to the laser beam 202 as described above, the stimulable phosphor sheet 103 emits light in proportion to the amount of energy stored thereon when it was exposed to radiation, and the emitted light enters a light guide member 207 which may be of the shape and material disclosed in U.S. Pat. No. 4,346,295. The light is guided inside of the light guide member 207 through total reflection, emanated from a light output face of the light guide member 207 and received by a photodetector 208 constituted of a photomultiplier or the like. The light receiving face of the photodetector 208 is placed in close contact with a filter, which transmits only light having wavelengths distributed within the wavelengths range of the light emitted by the stimulable phosphor sheet 103 and filters out light having other wavelengths, e.g. wavelengths within the range of the stimulating rays, so that the photodetector 208 detects only the light emitted by the stimulable phosphor sheet 103 upon stimulation thereof. The light detected by the photodetector 208 is converted into an electric signal carrying the image input information, which was stored on the stimulable phosphor sheet 103, and the electric signal is then amplified by an amplifier 209. The signal generated by the amplifier 209 is digitized by an A/D converter 211, and sent as a preliminary read-out image signal Sp to a final read-out control circuit 314 at the final read-out section 140. On the basis of the image input information which the preliminary read-out image signal Sp represents, the final read-out control circuit 314 calculates a read-out gain setting value (a), a scale factor setting value (b), and a reproduced image processing condition setting value (c). The preliminary read-out image signal Sp is also sent to an irradiation field recognition circuit 220 and a subdivision pattern recognizing circuit 250 which will be described in detail later.

After the preliminary read out is finished, the stimulable phosphor sheet 103 is sent to the final read-out section 140. At this section, a laser beam 302 emanating from a laser beam source 301 is first passed through a filter 303 for filtering out light having wavelengths within the range of wavelengths of light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306 Between the light deflector 305 and the plane reflection mirror 306 an fθ lens 307 is disposed for keeping the beam diameter of the laser beam 302 uniform while the laser beam 302 scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320 constituted of conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the amount of energy stored thereon when it was exposed to radiation, and the light which is emitted enters a light guide member 309 which is made of the same material and has the same configuration as the light guide member 207 used for the preliminary read out. The light emitted by the stimulable phosphor sheet 103 is guided inside of the light guide member 309 through total reflection, emanated from the light output face of the light guide member 309 and received by a photodetector 310 constituted of a photomultiplier or the like. The light receiving face of the photodetector 310 is placed in close contact with a filter for selectively transmitting only light having wavelengths distributed within the range of the wavelengths of light emitted by the stimulable phosphor sheet 103, so that the photodetector 310 detects only the light emitted thereby.

The output of the photodetector 310 photoelectrically detecting the light emission representing the radiation image stored on the stimulable phosphor sheet 103 is amplified to an appropriate level by an amplifier 311, the read-out gain of which has been adjusted by the read-out gain setting value (a) calculated by the control circuit 314. The amplified electric signal is fed to an A/D converter 312 which converts the electric signal into a digital signal by use of a scale factor which has been adjusted by the scale factor setting value (b) to suit the width of the signal fluctuation. The digital signal thus obtained is fed to a signal processing circuit 313, in which it is subjected to signal processing (image processing) based on the reproduced image processing condition setting value (c) so as to obtain a visible radiation image suitable for viewing, particularly for diagnostic purposes, and is output as a read-out image signal (final read-out image signal) So.

The final read-out image signal So generated by the signal processing circuit 313 is fed to a light modulator 401 at the image reproducing section 150. At the image reproducing section 150, a laser beam 403 emanating from a reproducing laser beam source 402 is modulated by the light modulator 401 on the basis of the final read-out image signal So received from the signal processing circuit 313, and is made to impinge upon a photosensitive material 405, such as a photographic film, by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image represented by the final read-out image signal So is recorded on the photosensitive material 405. For reproducing the radiation image, it is possible to use any other appropriate method such as using a CRT display device.

Figure 5:
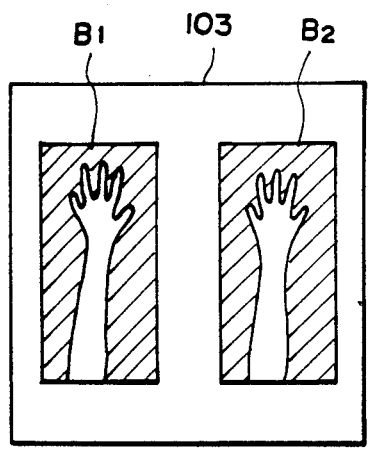
FIGS. 5 and 6 are explanatory views showing the conditions under which radiation image information is recorded on stimulable phosphor sheets.
Figure 7:
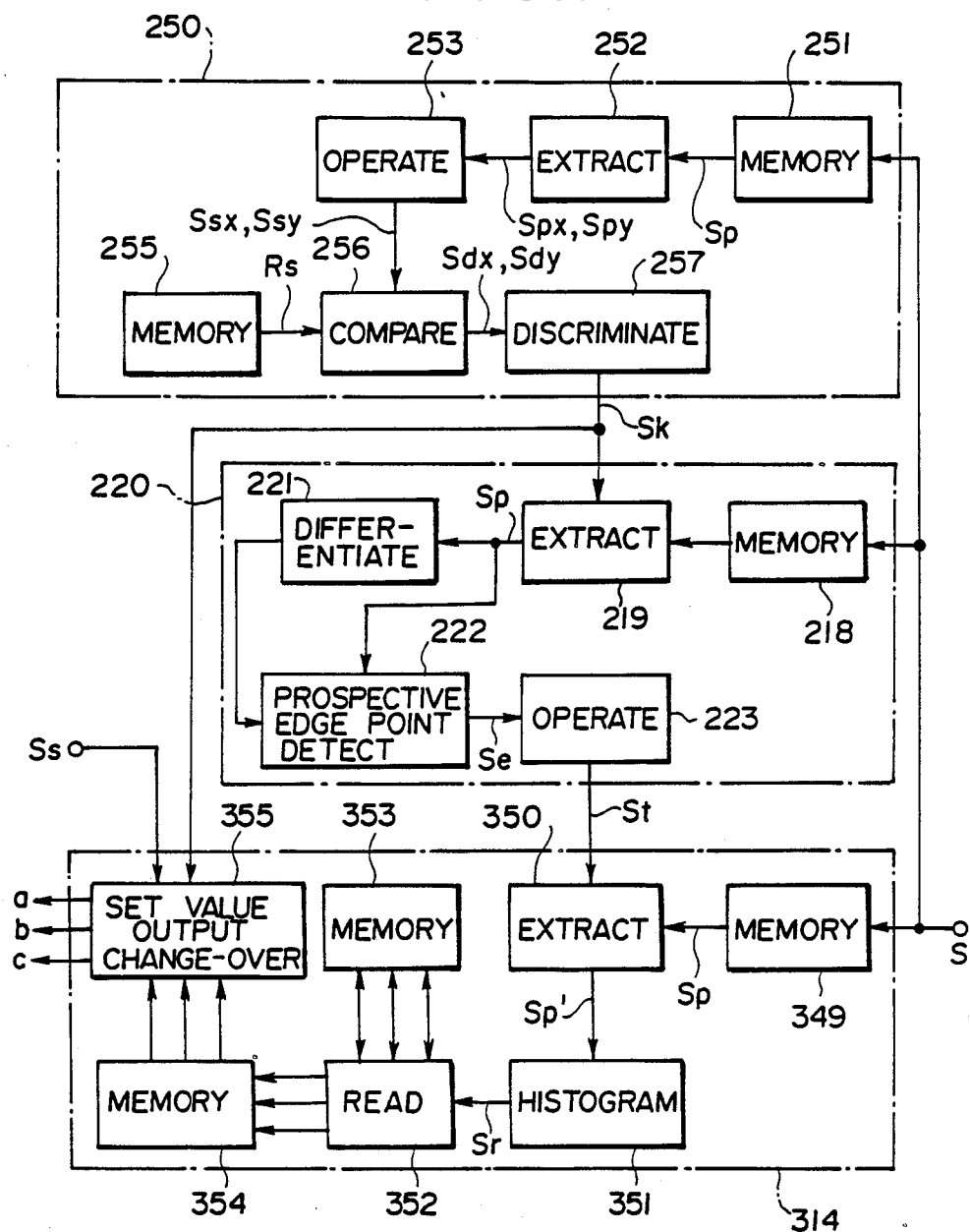
FIG. 7 is a block diagram showing part of the radiation image recording and reproducing system shown in FIG. 4.

A technique for accurately adjusting the read-out gain setting value (a), the scale factor setting value (b) and the image processing condition setting value (c), even though subdivision image recording has been carried out on the stimulable phosphor sheet 103 and the irradiation fields B1 and B2 are limited in the respective subdivisions as shown in FIG. 5 will hereinbelow be described with reference to FIG. 7. As shown in FIG. 7, the control circuit 314 comprises a frame memory 349, a signal extracting section 350, a histogram analysis section 351, a read section 352, memories 353 and 354, and a setting value output change-over section 355. The aforesaid preliminary read-out image signal Sp is stored in the frame memory 349, and then sent to the signal extracting section 350 which extracts the preliminary read-out image signal Sp' only within a region specified as will be described later. The preliminary read-out image signal Sp' is sent from the signal extracting section 350 to the histogram analysis section 351. The histogram analysis section 351 creates a histogram of the preliminary read-out image signal Sp', calculates the maximum value, the minimum value, the signal value at which the frequency is the maximum in the histogram, or the like, and sends a signal Sr representing the calculated value to the read section 352. The memory 353 stores the read-out gain setting values (a), the scale factor setting values (b), and the image processing condition setting values (c) suitable for various maximum values, minimum values, signal values at which the frequency is the maximum, or the like. The read section 352 reads the setting values (a), (b) and (c) suitable for the particular signal Sr from the memory 353, and stores the setting values (a), (b) and (c) in the memory 354. As will be described later, two values or four values may be calculated for each of the setting values (a), (b) and (c). In this case, the setting value output change-over section 355 changes the setting values in synchronization with the scanning of the laser beam 302 during final read out, and sends them respectively to the amplifier 311, the A/D converter 312, and the signal processing circuit 313. How the two values or four values stored for each of the setting values (a), (b) and (c) are exchanged for each other and output will be described in detail later.

Figure 6:
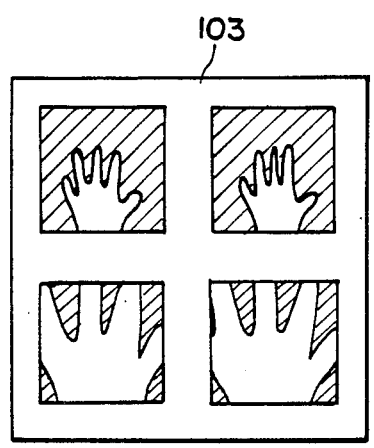

Signal extraction by the signal extracting section 350 will now be described below. In this embodiment, two-on-one subdivision image recording as shown in FIG. 5 and four on-one subdivision image recording as shown in FIG. 6 may be carried out as well as the recording of a single radiation image on a single stimulable phosphor sheet 103. Also, both when recording a single radiation image on a single stimulable phosphor sheet 103 and when doing subdivision image recording, the irradiation field may be limited by use of the irradiation field stop 104. The subdivision pattern recognizing circuit 250 recognizes the subdivision pattern, i.e. the four-on-one subdivision pattern, the two-on-one subdivision pattern or the null subdivision, which was employed image during recording, and sends a signal Sk representing the subdivision pattern to the irradiation field recognizing circuit 220 and the final read out control circuit 314.

Recognition of the subdivision pattern by the subdivision pattern recognizing circuit 250 will hereinbelow be described in detail. The preliminary read-out image signal Sp is stored in a frame memory 251 of the subdivision pattern recognizing circuit 250. From the stored preliminary read-out image signal Sp, a signal extracting section 252 extracts an image signal Spx at a region Fx which extends horizontally across the middle of the stimulable phosphor sheet 103, as viewed in the vertical direction in FIG. 8. The signal extracting section 252 feeds the extracted image signal Spx to an operating section 253. As is clear from FIG. 8, the region Fx is the sheet region which constitutes the boundary between the subdivisions in cases where the four-on one subdivision image recording has been carried out. The operating section 253 calculates the variance $s^2(x)$ of the digital image signal Spx, which variance is expressed as $$s^2(x) = (\Sigma x_i^2 - nx^2)/(n-1)$$

where x denotes the mean value. By way of example, the number of samples i, i.e. taken over a region the size of Fx, may be equivalent to the number of picture elements present on several picture element lines extending horizontally in FIG. 8. Alternatively, the image signal Spx may result from samples taken only at picture elements extracted at intervals over the whole length of the picture element lines.

The operating section 253 sends a single Ssx representing the value of the variance $s^2(x)$ to a comparing section 256. The comparing section 256 compares the value of the variance $s^2(x)$ with a reference value Rs stored in a memory 255. When $s^2(x) < Rs$, the comparing section 256 recognizes that the region Fx is a boundary between subdivisions, and sends a signal Sdx, which indicates that the region Fx is a boundary between subdivisions, to a discriminating section 257. A boundary between subdivisions is a region which was exposed only to radiation scattered by the object 101 during radiation image recording. Therefore, if the region Fx is a boundary between subdivisions, the image signal Spx at the region Fx is nearly uniform, and the value of the variance $s^2(x)$ is small. Conversely, if the region Fx is an ordinary image region, the value of the variance $s^2(x)$ is markedly larger than in the aforesaid case. Accordingly, it is possible to determine in the manner described above whether the region Fx is or is not a boundary between subdivisions.

Figure 8:
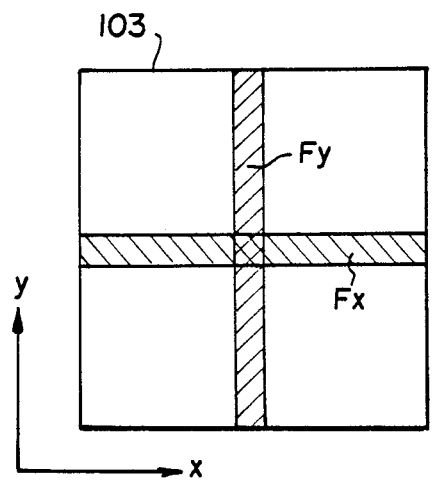
FIG. 8 is an explanatory view showing boundary regions among subdivisions on a stimulable phosphor sheet.

After the processing described above is finished, the signal extracting section 252 extracts an image signal Spy at a region Fy which extends vertically along the middle of the stimulable phosphor sheet 103, as viewed in the horizontal direction shown in FIG. 8. The signal extracting section 252 feeds the extracted image signal Spy to the operating section 253. As is clear from FIG. 8, the region Fy is the sheet region which constitutes a boundary between subdivisions in cases where two-on-one or four-on-one subdivision image recording has been carried out. Thereafter, processing is carried out in the same manner described above. The comparing section 256 receives a signal Ssy representing the variance $s^2(y)$ of the image signal Spy in the region Fy, and compares the value of the variance $s^2(y)$ with the reference value Rs. When $s^2(y) < Rs$, the comparing section 256 sends a signal Sdy, which indicates that $s^2(y) < Rs$, to the discriminating section 257. As in the case of the image signal Spx, when $s^2(y) < Rs$, the region Fy is recognized to be a boundary between subdivisions.

The discriminating section 257 judges that subdivision image recording was carried out in a four-on-one subdivision pattern in cases where both the signal Sdx and the signal Sdy are received, that the subdivision image recording was carried out in a two-on-one subdivision pattern in cases where the signal Sdx alone is received, and that image recording was carried out in a null subdivision pattern, i.e. in the one-on-one pattern, in cases where neither the signal Sdx nor the signal Sdy is received. The discriminating section 257 sends the signal Sk representing the subdivision pattern to the irradiation field recognizing circuit 220 and the final read-out control circuit 314.

Figure 9:
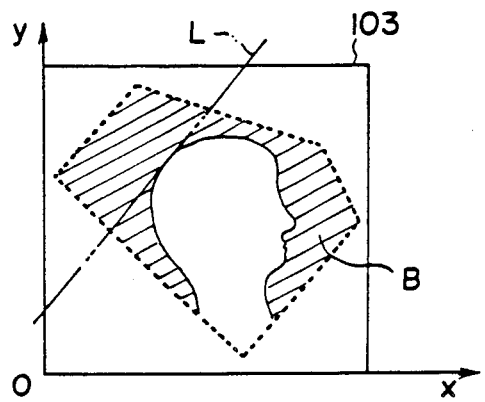
FIGS. 9, 10 and 11 are explanatory views showing a method for recognizing an irradiation field.

The irradiation field recognizing circuit 220 performs processing which recognizes the irradiation field in each of the subdivisions represented by the signal Sk, and sends a signal St representing the irradiation field in each subdivision to the signal extracting section 350 of the final read-out control circuit 314. The processing for recognizing the irradiation fields in single subdivisions of the stimulable phosphor sheet 103 can be carried out by use of an algorithm which is more simple than the algorithm for recognizing a plurality of irradiation fields in the overall region of the stimulable phosphor sheet 103. Such processing for recognizing single irradiation fields can be carried out by use of a method as disclosed in, for example, Japanese Unexamined Patent Publication No. 61(1986)-39039. However, in this embodiment, a method capable of accurately recognizing an irradiation field having an irregular polygonal shape is carried out by utilizing the Hough transformation. The irradiation field recognizing circuit 220 for carrying out such a method will now be described in detail. First, the case in which the subdivision pattern, which the signal Sk represents, is the null subdivision pattern, i.e. the one-on-one subdivision pattern, will be described below. In this case, a signal extracting section 219 of the irradiation field recognizing circuit 220 which receives the signal Sk feeds the preliminary read-out image signal Sp stored in a frame memory 218 to a differentiation processing section 221 and a prospective edge point signal detecting section 222. The differentiation processing section 221 differentiates the digital preliminary read-out image signal Sp, which stores the picture elements in a predetermined array. Differentiation may be one-dimensional differentiation of the first or higher orders, or may be two-dimensional differentiation of the first or higher orders. In cases of discretely sampled images, differentiation is equivalent to the calculation of the differences between neighboring array elements. In this embodiment, the differentiation processing section 221 calculates the aforesaid differences. Also, the prospective edge point signal detecting section 222 extracts array elements of the preliminary read-out image signal Sp at points where the differences between neighboring elements exceed a predetermined value, calculates the positions of the picture elements corresponding to the extracted preliminary read-out image signal array elements, and sends signals Se representing the positions of the picture elements to an operating section 223. In this case, most of the array elements of the preliminary read-out image signal Sp extracted in the manner described above represent the edges of the irradiation field B on the stimulable phosphor sheet 103 as shown in FIG. 9. Detection of the image edges may also be carried out by use of a method as proposed in, for example, Japanese Patent Application No. 60(1985)-155845. As shown in FIG. 9, the positions of the picture elements are expressed in an x-y orthogonal coordinate system on the stimulable phosphor sheet 103.

Figure 10:
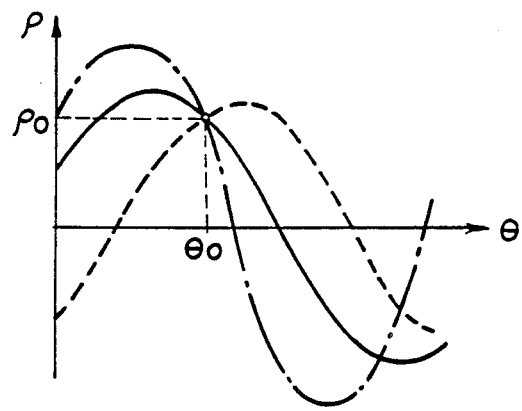

When the coordinates of the picture element positions (prospective edge points) which the signals Se represent are taken as (xo,yo), the operating section 223 calculates the curves expressed as $$p = xo \cos \theta + yo \sin r\theta$$

with xo and yo being constants, for all of the prospective edge point coordinates (xo,yo). FIG. 10 shows the curves thus obtained, and the number of the curves equals the number of the prospective edge point coordinates (xo,yo).

Then, the operating section 223 calculates where a number of the curves intersect (po, $\theta$o), said number being not smaller than a predetermined number Q of the plurality of the aforesaid curves. Because of errors in the calculation of the prospective edge point coordinates (xo,yo), many curves rarely intersect at exactly a single point. Therefore, by way of example, when intersections of multiple sets of two curves are present and spaced from one another by small distances not longer than a predetermined distance, the middle of the group of the intersections is taken as the aforesaid point of intersection (po,$\theta$o). Then, from the point of intersection (po,$\theta$o), the operating section 223 calculates a straight line expressed as $$po = x \cos r\theta o + y \sin \theta o$$

on the x-y orthogonal coordinate system. The straight line thus calculated extends along a plurality of the prospective edge point coordinates (xo,yo). It often occurs that bone edges or other image portions at which the image density changes sharply in the irradiation field B are also detected as prospective edge points. Therefore, as shown in FIG. 9, there is the risk that a straight line, such as L, will connect said prospective edge points with the prospective edge points of an irradiation field contour. However, if the aforesaid predetermined number Q is adjusted to be substantially large (for example, 20 or more), the straight line L is not obtained. Instead, only the straight line representing the irradiation field contour along many prospective edge points is obtained.

Figure 11:
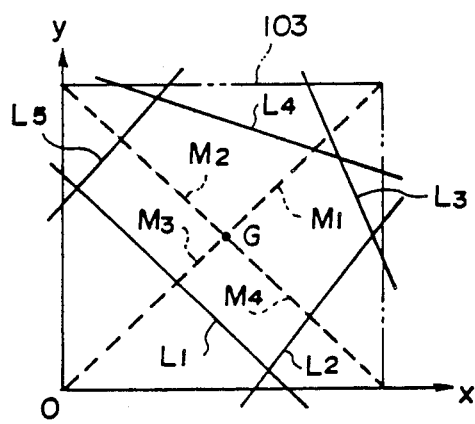

In the case where the prospective edge points are distributed as shown in FIG. 9, the straight lines shown in FIG. 11 are obtained. The operating section 223 then detects the region surrounded by a plurality of straight lines L1, L2, L3, . . . , Ln obtained in this manner, and recognizes said region as the irradiation field B. Specifically, for example, the region is recognized in the manner described below. The operating section 223 stores line segments M1, M2, M3, . . . , Mm connecting the corners of the stimulable phosphor sheet 103 with the center G (four line segments in the case, in which the stimulable phosphor sheet 103 is rectangular), and detects the presence or absence of an intersection of each of the line segments M1 to Mm with each of the straight lines L1 to Ln. When an intersection is present, the operating section 223 discards the plane on the side of the stimulable phosphor sheet 103 which includes the corner, which is one of the two planes into which the stimulable phosphor sheet 103 is divided by the straight line. This operation is carried out for all of the straight lines L1 to Ln and the line segments M1 to Mm, and the region surrounded by the straight lines L1 to Ln is not discarded. The region thus obtained is recognized as the irradiation field B.

The operating section 223 sends the signal St representing the irradiation field B recognized in the manner described above to the signal extracting section 350 of the final read-out control circuit 314. The signal extracting section 350 extracts an image signal for the region which the signal St represents from the preliminary read-out image signal Sp stored in the frame memory 349, and sends the extracted image signal to the histogram analysis section 351. Therefore, histogram analysis in the histogram analysis section 351 is carried out only for the region of the stimulable phosphor sheet 103 that was actually exposed to radiation, and the aforesaid setting values (a), (b) and (c) are adjusted so that they are suitable for the actual image input information.

In cases where the irradiation field used when recording a single image on a stimulable phosphor sheet 103 is not limited, the setting values (a), (b) and (c) are adjusted on the basis of the preliminary read-out image signal Sp for the overall region on the stimulable phosphor sheet 103. This also applies when the irradiation field in each of the subdivisions is not limited. In such cases, the setting values (a), (b) and (c) are adjusted on the basis of the preliminary read-out image signal Sp for the overall region of each subdivision.

For null subdivision image recording on the stimulable phosphor sheet 103, a single value is obtained for each of the setting values (a), (b) and (c). The setting values (a), (b) and (c) are stored in the memory 354, and sent to the A/D converter 312 and the signal processing circuit 313 via the setting value output change-over section 355. As mentioned above, the subdivision pattern signal Sk is fed from the subdivision pattern recognizing circuit 250 to the setting value output change-over section 355. When the signal Sk represents the null subdivision pattern, the setting value output change-over section 355 outputs the predetermined setting values (a), (b) and (c) as long as radiation image read-out (i.e. the final read-out) is being carried out on a single stimulable phosphor sheet 103. That is, no change in the setting values is made (only a single value is stored for each of the setting values (a), (b) and (c) in the memory 354).

In cases where the signal Sk received from the subdivision pattern recognizing circuit 250 represents a four-on-one subdivision pattern, the signal extracting section 219 in the irradiation field recognizing circuit 220 extracts the preliminary read-out image signal Sp for one of the four subdivisions from the preliminary read-out image signal Sp stored in the frame memory 218, and sends the extracted preliminary read-out image signal Sp to the differentiation processing section 221 and the prospective edge point signal detecting section 222. In the differentiation processing section 221, the prospective edge point signal detecting section 222 and the operating section 223, processing is carried out for the preliminary read-out image signal Sp, corresponding to one of the four subdivisions, in the same manner as for a null subdivision pattern, and the irradiation field in said subdivision is recognized. Thereafter, the preliminary read-out image signal Sp in the three remaining subdivisions of the four-on-one subdivision recording is sequentially extracted in a predetermined sequence, and the irradiation fields in the respective subdivisions are recognized.

Therefore, four sets of irradiation field signals St are sent to the final read-out control circuit 314, and the final read-out control circuit 314 calculates four setting values a1 to a4, four setting values b1 to b4, and four setting values c1 to c4 which correspond to the respective irradiation field signals St. The setting values a1 to a4, the setting values b1 to b4, and the setting values c1 to c4 are stored in the memory 354. Also, the setting value output change-over section 355 receives the signal Sk representing the subdivision pattern from the subdivision pattern recognizing circuit 250. When the final read out is carried out in the final read-out section 30, the setting value output change-over section 355 identifies which subdivision is being scanned as well as the region on which the final read out is being carried out, by, for example, receiving a synchronizing signal Ss which is synchronous with the operation of the light deflector 305 and the sheet conveyance means 320. The setting value output change-over section 355 reads the read-out gain setting value a1, a2, a3 or a4, the scale factor setting value b1, b2, b3 or b4, and the image processing condition setting value c1, c2, c3 or c4, that correspond to the identified subdivision, selectively from the memory 354, and sends the setting values respectively to the amplifier 311, the A/D converter 312, and the signal processing circuit 313. Therefore, even though the image input information and/or the irradiation fields are different among the subdivisions, the final read-out conditions such as the read-out gain and the scale factor, and the image processing conditions can be suitably adjusted for the image input information in every subdivision.

In cases where a signal Sk representing a two-on-one subdivision pattern is fed from the subdivision pattern recognizing circuit 250 to the signal extracting section 219 of the irradiation field recognizing circuit 220, the setting values a1 and a2, the setting values b1 and b2, and the setting values c2 and c2 are calculated in the same manner described above. During the final read-out, the setting values are selectively changed by the setting value output change-over section 355.

In the aforesaid embodiment of the method for recognizing a subdivision pattern of radiation images in accordance with the present invention, variances are utilized as the characteristic values representing the degree of variation in the image signal Spx and Spy at the sheet regions Fx and Fy. However, by way of example, the difference between the maximum signal value and the minimum signal value may also be utilized as such a characteristic value.

In the radiation image recording and reproducing system shown in FIG. 4, the preliminary read-out section and the final read-out section are disposed independently. However, as disclosed in, for example, Japanese Unexamined Patent Publication No. 58(1983)-67242, a single read-out system may be used to carry out the preliminary read out and the final read out. In such cases, after the preliminary read out is finished, the stimulable phosphor sheet is returned to the read-out system by a sheet conveyance means and then the final read-out is carried out. In the preliminary read-out step, the stimulation energy of the stimulating rays is adjusted by a stimulating ray energy adjusting means to be lower than the stimulation energy of the stimulating rays used in the final read out. The method for recognizing a subdivision pattern of radiation images in accordance with the present invention is also applicable in such cases.

Also, instead of recognizing the subdivision pattern based on the preliminary read-out image signal, the subdivision pattern may be recognized by the utilization of the final read-out image signal in accordance with the present invention. Under these circumstances, the information about the subdivision pattern can be utilized for, for example, adjusting the image processing condition setting value (c) so that it is suitable for each subdivision.

Furthermore, the method for recognizing a subdivision pattern of radiation images in accordance with the present invention is applicable when the radiation images are read out from a recording medium different from the stimulable phosphor sheet, such as a silver halide photographic film.

We claim:

1. In a radiation image read-out and reproducing system for scanning a stimulable phosphor sheet, on which a single radiation image or a plurality of radiation images have been stored, with a light beam which causes the stimulable phosphor sheet to emit light in proportion to the amount of energy stored during exposure to radiation, photoelectrically detecting the emitted light to obtain image signals, and reproducing visible images by use of the image signals, a method for recognizing the layout pattern of radiation images, which comprises the steps of:
(i) preparing in advance a two-valued mask composed of a two-valued signal corresponding to a single type of layout pattern of radiation images which are to be stored on a stimulable phosphor sheet, or preparing in advance two-valued masks each composed of a two-valued signal which corresponds to one of a plurality of types of layout patterns of radiation images which are to be stored on a stimulable phosphor sheet,
(ii) obtaining a preliminary read-out image signal by carrying out preliminary read out, wherein radiation images stored on a stimulable phosphor sheet are approximately ascertained by scanning said stimulable phosphor sheet with a light beam, having an energy level lower than the energy level of the light beam used for the final read out, before the final read out for obtaining said image signal for use in reproduction of visible images is carried out by detecting light emitted by said stimulable phosphor sheet in proportion to the amount of energy stored during exposure to radiation, and
(iii) recognizing the layout pattern of said radiation images by:
(a) converting said preliminary read-out image signals into a two-valued system to obtain a two-valued image signal,
(b) calculating rating values, which represent the degree of pattern matching between said two-valued image signal and each of said two-valued masks,
(c) finding the highest rating value that represents the highest degree of pattern matching among the rating values thus calculated, and
(d) comparing said highest rating value with a predetermined value representing a predetermined degree of pattern matching.

2. A method for recognizing the layout pattern of radiation images as defined in claim 1 wherein said rating value is a count of the number of points at which both the two-valued image signal and the two-valued signal of a two-valued mask at corresponding picture elements on the stimulable phosphor sheet are of a value equal to "1".

3. A method for recognizing the layout pattern of radiation images as defined in claim 1 wherein said rating value is a count of the number of points at which both the two-valued image signal and the two-valued signal of a two-valued mask at corresponding picture elements on the stimulable phosphor sheet are of a value equal to "0".

4. A method for recognizing the layout pattern of radiation images as defined in claim 1 wherein said rating value is the sum of the number of points at which both the two-valued image signal and the two-valued signal of a two-valued mask at corresponding picture elements on the stimulable phosphor sheet are of a value equal to "1", and the number of points at which both the two-valued image signal and the two-valued signal of the two-valued mask at corresponding picture elements on the stimulable phosphor sheet are of a value equal to "0".

5. In a radiation image read-out and reproducing system for scanning a recording medium, on which a single radiation image or a plurality of radiation images have been recorded, with a light beam, photoelectrically detecting light which is emitted from the recording medium during the scanning and which carries information representing the radiation images, thereby to obtain image signals, and reproducing visible images by use of the image signals, a method for recognizing the layout pattern of radiation images, which comprises the steps of:
(i) preparing in advance a two-valued mask composed of a two-valued signal corresponding to a single type of layout pattern of radiation images which are to be recorded on a recording medium, or preparing in advance two-valued masks each composed of a two-valued signal which corresponds to one of a plurality of types of layout patterns of radiation images which are to be recorded on a recording medium, and
(ii) recognizing a layout pattern of said radiation images by:
(a) converting said image signals into a two-valued system to obtain a two-valued image signal,
(b) calculating rating values, which represent the degree of pattern matching between said two-valued image signal and each of said two-valued masks,
(c) finding the highest rating value that represents the highest degree of pattern matching among the rating values thus calculated, and
(d) comparing said highest rating value with a predetermined value representing a predetermined degree of pattern matching.

6. A method for recognizing the layout pattern of radiation images as defined in claim 5 wherein said rating value is a count of the number of points at which both the two-valued image signal and the two-valued signal of a two-valued mask at corresponding picture elements on the recording medium are of a value equal to "1".

7. A method for recognizing the layout pattern of radiation images as defined in claim 5 wherein said rating value is a count of the number of points at which both the two-valued image signal and the two-valued signal of a two-valued mask at corresponding picture elements on the recording medium are of a value equal to "0".

8. A method for recognizing the layout pattern of radiation images as defined in claim 5 wherein said rating value is the sum of the number of points at which both the two-valued image signal and the two-valued signal of a two-valued mask at corresponding picture elements on the recording medium are of a value equal to "1", and the number of points at which both the two-valued image signal and the two-valued signal of the two-valued mask at corresponding picture elements on the recording medium are of a value equal to "0".

9. A method for recognizing the subdivision pattern of radiation images, which comprises the steps of, in the course of reading out radiation image information from a recording medium on which the radiation image information of an object has been recorded by radiation image recording, and obtaining image signals representing the radiation image information:

(i) in cases where subdivision image recording has been carried out by exposing each of a plurality of predetermined subdivisions on said recording medium to radiation, calculating a characteristic value which represents the degree of variation of the value of an image signal at a recording medium region which may constitute a boundary between said subdivisions, and (ii) recognizing an image subdivision pattern on said recording medium by determining, when said characteristic value is comparatively small, that a subdivision was effected at said recording medium region, and by determining, when said characteristic value is comparatively large, that no subdivision was effected at said recording medium region.

10. A method for recognizing the subdivision pattern of radiation images as defined in claim 9 wherein said characteristic value is the variance of the values of the image signal corresponding to the recording medium region constituting a boundary between said subdivisions.

11. A method for recognizing the subdivision pattern of radiation images as defined in claim 9 wherein said characteristic value is the difference between the maximum value and the minimum value of the image signal corresponding to the recording medium region constituting a boundary between said subdivisions.

12. A method for recognizing the subdivision pattern of radiation images as defined in claim 9 wherein said recording medium is a stimulable phosphor sheet.

13. A method for recognizing the subdivision pattern of radiation images as defined in claim 9 wherein said image signals are obtained from preliminary read-out

* * * * *